Figure 1:
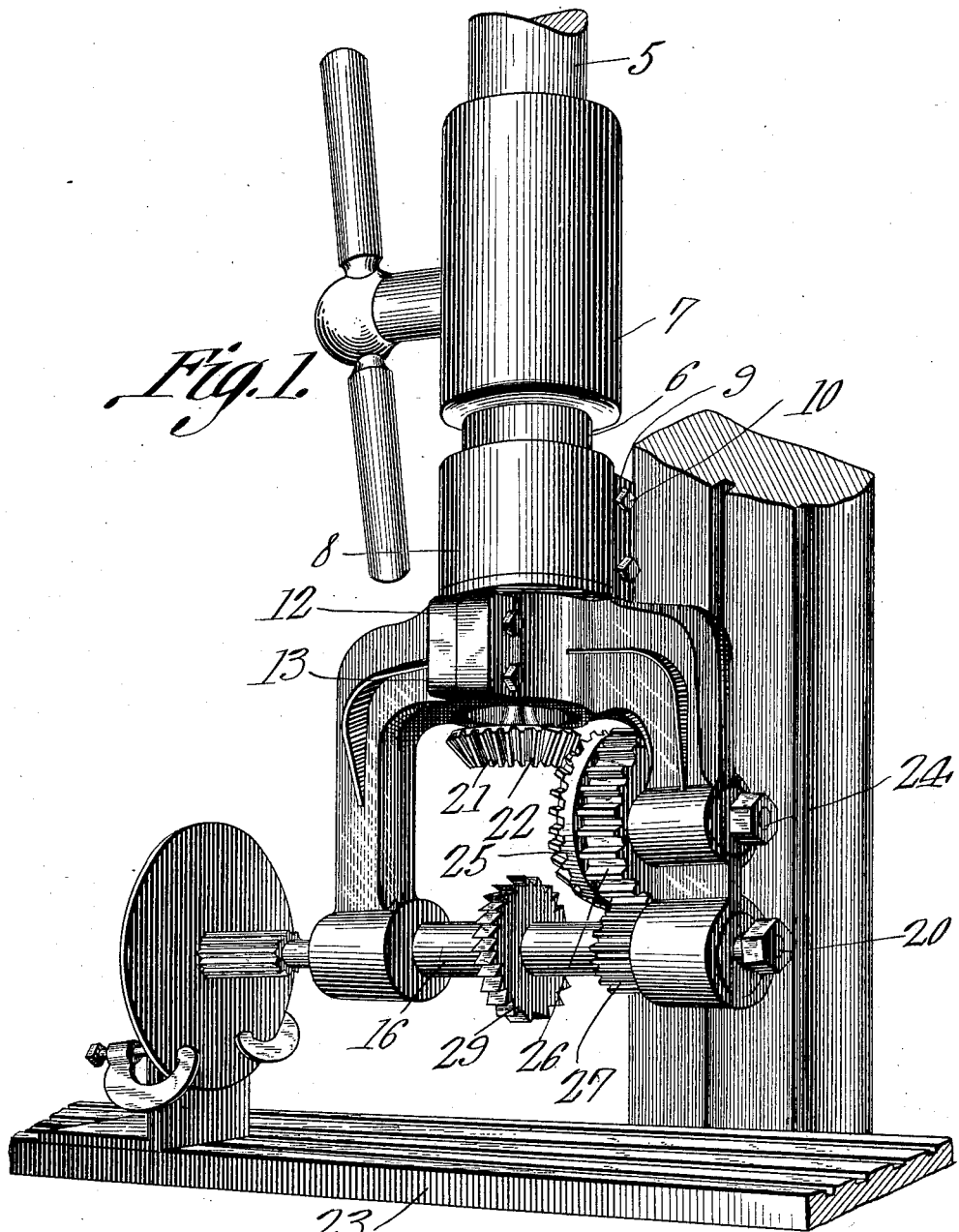

R. H. RITTER.
MILLING ATTACHMENT FOR DRILL PRESSES.
APPLICATION FILED APR. 11, 1911.

1,029,402.

Patented June 11, 1912.
2 SHEETS—SHEET 1.

R. H. Ritter,
Inventor

Witnesses by C. A. Snow & Co.
Attorneys

R. H. RITTER.
MILLING ATTACHMENT FOR DRILL PRESSES.
APPLICATION FILED APR. 11, 1911.
1,029,402.
Patented June 11, 1912.
2 SHEETS—SHEET 2.
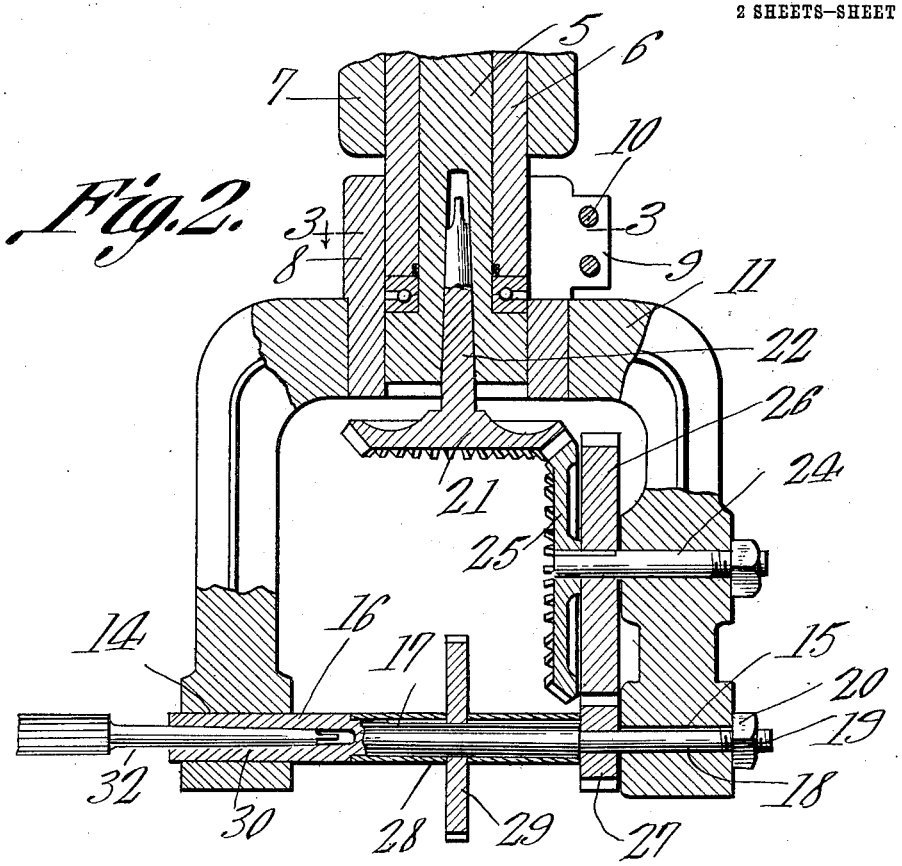
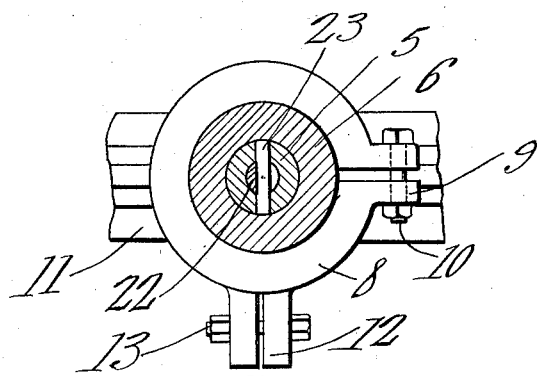
Witnesses
R. H. Ritter, Inventor
by C. A. Snow & Co., Attorneys

UNITED STATES PATENT OFFICE.

RICHARD H. RITTER, OF SEDALIA, MISSOURI.

MILLING ATTACHMENT FOR DRILL-PRESSES.

1,029,402.  Specification of Letters Patent. Patented June 11, 1912.

Application filed April 11, 1911. Serial No. 620,299.

*To all whom it may concern:*

Be it known that I, RICHARD H. RITTER, a citizen of the United States, residing at Sedalia, in the county of Pettis and State of Missouri, have invented a new and useful Milling Attachment for Drill-Presses, of which the following is a specification.

It is the object of the present invention to provide an improved milling attachment for a drill press, the primary aim of the invention being to so construct the attachment that its tool supporting shaft may either support a milling disk or wheel or a drill bit or the like, the attachment being thus constructed to perform different kinds of work.

A further aim of the invention is to so construct the attachment and so mount the same upon the drill press that it may be adjusted to any desired angle and may consequently act upon work disposed at any convenient angle upon the table of the press.

In the accompanying drawings:—Figure 1 is a perspective view of a portion of a drill press illustrating the attachment mounted thereon. Fig. 2 is a vertical transverse sectional view through the said portion of the press and through the attachment. Fig. 3 is a sectional view on the line 3—3 of Fig. 2.

In the drawings, there is shown a portion of a drill press and of the mechanism shown, the spindle of the press is indicated by the numeral 5 and the spindle quill by the numeral 6, the latter being mounted for vertical adjustment in a sleeve 7. A collar 8 is clamped upon the quill 6 at the lower end thereof, the collar being preferably split and formed with ears 9 through which are secured clamping bolts 10 for the purpose stated. The frame or body of the attachment is in the nature of an inverted U-shaped yoke 11 which is split at its intermediate portion and is formed at each side of its split with an ear 12, clamping bolts 13 being secured through these ears. It will be observed that the yoke may be adjusted angularly about the axis of the quill and spindle as desired.

One arm of the yoke 11 is formed with a bearing 14 and the other arm is formed with a smaller bearing 15 alined with the bearing 14. A spindle 16 is reduced as at 17 throughout its intermediate portion and is further reduced as at 18 and threaded as at 19, at and near one end. The opposite end of the spindle is rotatably journaled in the bearing 14, while its reduced portion 18 is journaled in the bearing 15 and a nut 20 threaded upon the latter end of the spindle serves to hold the same against displacement. A bevel gear 21 is formed with a Morse taper stem 22 which is fitted in a socket formed in the lower end of the spindle 5. A short shaft 24 is journaled for rotation in one arm of the frame (preferably that arm in which the bearing 15 is) and upon this shaft is fixed a bevel gear 25 and a pinion 26. A pinion 27 is also fixed upon the reduced portion 18 of the spindle 16 and is in mesh with the pinion 26; the two bevel gears 21 and 25 are in mesh. From the foregoing it will be readily understood that rotation of the spindle 5 will result in a rotation of the spindle 16. Removably fitted upon the reduced portion 17 of the spindle 16 are sleeves 28 between the opposite ends of which is held a milling wheel 29, the sleeves being preferably of different lengths so that the wheel may be adjusted to occupy various positions upon the spindle.

To render the attachment adaptable for use in forming various kinds of work, the spindle 16 is formed in one end with a Morse taper socket 30 into which is removably fitted the tapered shank of a drill or milling bit 32. When the nut 20 is unscrewed or removed from the extremity of the secondary reduced portion of the spindle, the spindle may be withdrawn from the bearings in the arms of the U-shaped yoke, whereby the sleeves 28, milling wheel 29, and the pinion 27 will be removed from the spindle. The milling wheel 29 and the pinion 27 are slidable on the primary reduced portion 17 and the secondary reduced portion 18 of the spindle, respectively, and are fixed against rotation relative thereto. Thus by detaching the nut 20 and removing the spindle, the milling wheel may be substituted by another wheel of like character, or the sleeves 28, which are of different lengths, may be reversed, thus shifting the position of the milling wheel upon the spindle, when desired or necessary. The sleeves 28 are ordinarily arranged between the shoulder formed by the primary reduced portion 17 and the pinion 27, and when the nut 20 is tightened upon the extremity of the secondary reduced portion 18, the said sleeves, milling wheel and pinion are retained in position upon the spindle. A further feature of the present invention is the fact that the shaft 24 may be removed when the attachment is removed from the spindle of the drill press to free the gear 21 from the bevel gear 25, thereby permitting the pinion 26 to be slid off of the shaft 24. In this manner, the respective pinions 26 and 27 may be substituted by other pinions of different diameters for changing the speed of rotation of the spindle relative to the shaft 24, whenever desired or necessary. When the shaft 24 is held in position in the corresponding arm of the yoke, the pinion 26 is held between the bevel gear 25 and the said arm.

From the foregoing description of the invention it will be readily understood that either of the tools 29 and 32 may be employed in connection with the attachment and that the attachment may be adjusted angularly about the axis of the spindle 5 of the drill press so as to act, as desired, upon work held upon the table 33 of the press, attachment may be removed to permit of the use of the drill press in the ordinary manner when desired, the device being detachable.

What is claimed is:—

1. An attachment of the character described embodying an inverted U-shaped yoke, a spindle having one end journaled in one arm of the yoke and having primary and secondary reduced portions, the latter reduced portion being journaled in the other arm of the yoke, a pinion slidable on the secondary reduced portion of the spindle and fixed against rotation relative thereto, a pair of sleeves of different lengths on the primary reduced portion of the spindle and arranged between the pinion and the shoulder formed by the primary reduced portion, a milling wheel slidable on the primary reduced portion between the sleeves and fixed against rotation relative to the spindle, a nut screw-threaded on the extremity of the secondary reduced portion for retaining the said sleeves, milling wheel and pinion in position, and permitting the spindle to be withdrawn from the arms.

2. An attachment of the character described embodying an inverted U-shaped yoke, a spindle having one end journaled in one arm of the yoke and having primary and secondary reduced portions, the latter reduced portion being journaled in the other arm of the yoke, a pinion slidable on the secondary reduced portion and fixed against rotation relative thereto, a pair of sleeves on the primary reduced portion and arranged between the pinion and the shoulder formed by the primary reduced portion, a milling wheel slidable on the primary reduced portion between the sleeves and fixed against rotation relative to the spindle, a nut screw threaded on the extremity of the secondary reduced portion for retaining the sleeves, milling wheel and pinion in position and permitting the spindle to be removed, a short shaft journaled for rotation in one arm of the yoke and removable therefrom, a bevel gear fixed on the said shaft, and a pinion slidable on the said shaft and arranged between the bevel gear and the corresponding arm and fixed against rotation relative to the said shaft, whereby the pinions may be removed from the shaft and spindle for the purpose described.

In testimony that I claim the foregoing as my own, I have hereto affixed my signature in the presence of two witnesses.

RICHARD H. RITTER.

Witnesses:
STUART KING,
W. H. H. MYERS.

Copies of this patent may be obtained for five cents each, by addressing the "Commissioner of Patents, Washington, D. C."